2,943,019

United States Patent Office

Patented June 28, 1960

2,943,019

ANTICOCCIDIAL COMPOSITION AND METHOD OF COMBATTING COCCIDIOSIS

Michael P. Natt, Norwich, N.Y., assignor to The Norwich Pharmacal Company, Norwich, N.Y., a corporation of New York No Drawing. Filed June 24, 1958, Ser. No. 744,049

10 Claims. (Cl. 167—53.1)

This invention relates to poultry management and aims to provide a new composition having anticoccidial properties and a new method of combatting coccidiosis in poultry. My invention is more particularly concerned with an anticoccidial poultry feed and the control of coccidiosis in chickens through the administration to them of such feed.

The disease of poultry commonly referred to as "coccidiosis" is widespread. It is caused by species of the genus Eimeria. A particularly troublesome member is *Eimeria tenella* which lodges in the caesum of chickens and is responsible for severe and oftentimes fatal infections. The morbidity and mortality occasioned by this infection create an extensive economic loss if left untreated or unchecked. Particularly obnoxious in connection with this disease is the appearance of "bloody droppings" from the chickens provoked by rupture of their caecal mucosal tissue.

In the last decade, several drugs have been developed which possess anticoccidial properties but none of them is without some shortcomings. Apart from anticoccidial activity per se, other factors such as tolerability at effective dose levels of the drug, feed efficiency and conversion resulting when a drug-containing diet is employed, emergence of drug-resistant mutants, effect of drug on egg production and hatchability, permissive development of natural immunity in the presence of drug, activity at tolerable levels to combat and overcome massive infections sometimes encountered and economy of treatment must be considered in poultry management.

I have discovered that it is possible to combat coccidiosis in poultry by means of certain nitrofurans that can be combined with feedstuff administered to the poultry so that such feedstuff serves as an inert carrier therefor. These nitrofurans are fully tolerable at effective dose levels, can be employed for extensive time periods with generally beneficial effect upon the growth and development of the birds, are substantially non-toxic and are relatively inexpensive. They are readily consumed by poultry when combined with poultry feed. The nitrofurans that I employ in the practice of my invention are members of a series of 5-nitro-2-furfurylidene hydrazine compounds that may be represented by the following formula:

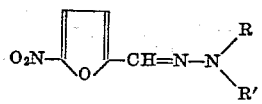

in which

R represents a member of the group consisting of hydrogen and lower alkyl, and

R' represents a member of the group consisting of hydrogen, lower alkyl and lower alkanoyl.

While each of the 5-nitro-2-furfurylidene hydrazine compounds included within the series employed in the practice of my invention is distinguished by its anticoccidial activity, the respective members of the series differ from each other somewhat in degree of anticoccidial effectiveness. The member that I now prefer to use is 1-acetyl-1-methyl-2-(5-nitrofurfurylidene) hydrazine.

In accordance with my invention, the selected member of said series is intimately admixed, as the active ingredient, with inert carriers commonly used in poultry management. Such carriers include ground oyster shells, Attapulgus clay, commercial poultry feeds, urea, corn meal, ground corn, citrus meal, fermentation residues and distillers' dried grains. In the practice of my invention, the mixing of the active ingredient with a carrier is accomplished by commonly used methods such as stirring, tumbling and grinding. In this way it is possible to prepare compositions of varying concentration to suit particular needs or desires. Premixes so prepared and containing from 1% to 25% of the active ingredient can then be added to poultry rations to provide desirable drug levels of from 0.003% to 0.02%.

In the practice of my invention, I prefer to employ a composition comprising a poultry feedstuff having incorporated therein an effective amount of active ingredient. For the prophylactic control of coccidiosis the amount of active ingredient is extremely low, a daily intake of 0.005% by weight of the food consumed serving well. However, for optimum results, I prefer a level within the range of about 0.0075% to 0.011%, such a level usually affording excellent protection. In the event an outbreak of the disease is encountered, higher concentration of the order of about 0.015% to about 0.02% may be employed.

The nitrofurans that I employ in the practice of my invention can be readily obtained. Their preparation involves the interaction of 5-nitro-2-furaldehyde and the appropriate hydrazine compound. For instance, 5-nitro-2-furfurylidene hydrazine may be obtained by reacting 5-nitro-2-furaldehyde with hydrazine; 1-acetyl-2-(5-nitrofurfurylidene) hydrazine may be prepared by reacting 5-nitro-2-furaldehyde with acethydrazide; and 1,1-dimethyl-2-(5-nitrofurfurylidene) hydrazine may be secured by reacting 5-nitro-2-furaldehyde with unsymmetrical dimethylhydrazine. In order that the members of the group of nitrofuran compounds that I employ in the practice of my invention may be readily available to those skilled in the art, the following illustrative examples of typical members are given:

EXAMPLE I

*1-methyl-2-(5-nitrofurfurylidene)hydrazine*

One mole of 5-nitro-2-furaldehyde is dissolved in 1 liter of ethanol and 64 gm. (1.0 mole) of methyl hydrazine is added. This mixture is stirred for 2 hours, then filtered and the solid obtained dried. The yield of 1-methyl-2-(5-nitrofurfurylidene)hydrazine is 106 gm. (65%).

EXAMPLE II

*1-acetyl-1-methyl-2-(5-nitrofurfurylidene)hydrazine*

The product of Example I is mixed with 350 cc. of acetic anhydride and brought to reflux for 15 minutes. The mixture is allowed to stand and the deposited solid is filtered and dried to yield 91 gm. (68%) of 1-acetyl-1-methyl-2-(5-nitrofurfurylidene)hydrazine.

EXAMPLE III

*1-acetyl-1-ethyl-2-(5-nitrofurfurylidene)hydrazine*

One mole of ethyl hydrazine sulfate is dissolved in 1 liter of water and treated with 450 cc. of a saturated sodium carbonate solution raising the pH to about 6. Over one-half hour, a solution of one mole of 5-nitro-2-furaldehyde in 1400 cc. of ethanol is added with vigorous stirring. The orange product is filtered to yield 151 gm. (82.5%), M.P.=119–121° C., of 1-ethyl-2-(5-nitrofurfurylidene)hydrazine. This product is refluxed with 500 cc. of acetic anhydride for 15 minutes, cooled to 0° C., the deposited solid filtered and thoroughly washed with methanol. There are obtained 170 gm. (91%), M.P.=172–174° C., of 1-acetyl-1-ethyl-2-(5-nitrofurfurylidene)hydrazine.

EXAMPLE IV

*1,1-dimethyl-2-(5-nitrofurfurylidene)hydrazine*

A mixture of 20 g. of dimethylhydrazine hydrochloride, 29 g. of 5-nitro-2-furaldehyde, 200 cc. of water and 600 cc. of ethyl alcohol is heated to boiling, filtered and the filtrate cooled. The precipitated solid is washed with a little cold alcohol and dried to give 32.5 g. (86%), M.P. 115° C., of 1,1-dimethyl-2-(5-nitrofurfurylidene)hydrazine.

EXAMPLE V

*1-butyryl-1-methyl-2-(5-nitrofurfurylidene)hydrazine*

In a flask are placed 119 gm. (0.7 mole) of the product of Example I, 220 cc. of butyric anhydride and 16.5 cc. of pyridine. This mixture is heated to achieve solution at 145° C. It is cooled and the deposited product collected. There are obtained 129 gm. (83%); M.P.=124–125° C., after recrystallization from methanol; of 1-butyryl-1-methyl-2-(5-nitrofurfurylidene)hydrazine.

EXAMPLE VI

*1-butyryl-2-(5-nitrofurfurylidene)hydrazine*

Thirty-one gm. of butyryl hydrazide is dissolved in 300 cc. of ethanol and 42 gm. of 5-nitro-2-furaldehyde is dissolved in 250 cc. of ethanol. The two solutions are combined and stirred with heating to 70° C. for 2 hours and then cooled. The deposited crystals of 1-butyryl-2-(5-nitrofurfurylidene)hydrazine weigh 33 gm. (50%) having a M.P. of 168–170° C.

EXAMPLE VII

*5-nitro-2-furfurylidene hydrazine*

5-nitro-2-furfural (5 g.) is dissolved in methanol (70 cc.) and the solution cooled by means of ice. Hydrazine hydrate (3.4 g.) is added dropwise with stirring over a period of about thirty minutes. The dark red solution is stirred for an additional ninety minutes; cooling being maintained over the entire period. It is then filtered. The filtrate is concentrated to a small volume and the precipitate formed removed by filtration. It is recrystallized from methanol in the form of bright red needles. There are obtained 3 g. (M.P. 166–167° C.) of 5-nitro-2-furfurylidene hydrazine.

What I claim is:

1. A composition having anticoccidial properties upon administration to poultry, comprising the combination of from about 0.003% to about 0.02% by weight thereof of a chemical compound represented by the formula:

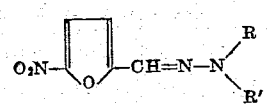

in which

R represents a member of the group consisting of hydrogen and lower alkyl, and

R′ represents a member of the group consisting of hydrogen, lower alkyl and alkanoyl and poultry feedstuff.

2. A composition having anticoccidial properties upon administration to poultry, comprising the combination of from about 0.0075% to about 0.011% by weight thereof of a chemical compound represented by the formula:

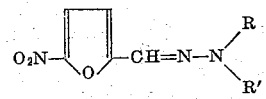

in which

R represents a member of the group consisting of hydrogen and lower alkyl, and

R′ represents a member of the group consisting of hydrogen, lower alkyl and alkanoyl and poultry feedstuff.

3. A concentrate adapted to be combined with a poultry feedstuff to provide a composition having anticoccidial properties upon administration to poultry, comprising the combination of and from about 1% to about 25% by weight thereof of a chemical compound represented by the following formula:

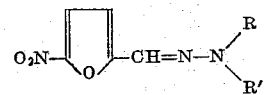

in which

R represents a member of the group consisting of hydrogen and lower alkyl, and

R′ represents a member of the group consisting of hydrogen, lower alkyl and alkanoyl and a nutrient carrier selected from the group consisting of ground oyster shells, commercial poultry feeds, urea, corn meal, ground corn, citrus meal, fermentation residues and distillers' dried grains.

4. A composition having anticoccidial properties upon administration to poultry, comprising the combination of from about 0.003% to about 0.02% by weight thereof of 1-acetyl-1-methyl-2-(5-nitrofurfurylidene)hydrazine and poultry feedstuff.

5. A composition having anticoccidial properties upon administration to poultry, comprising the combination of from about 0.003% to about 0.02% by weight thereof of 1-acetyl-1-ethyl-2-(5-nitrofurfurylidene)hydrazine and poultry feedstuff.

6. A composition having anticoccidial properties upon administration to poultry, comprising the combination of from about 0.003% to about 0.02% by weight thereof of 1,1-dimethyl-2-(5-nitrofurfurylidene)hydrazine and poultry feedstuff.

7. A composition having anticoccidial properties upon administration to poultry, comprising the combination of from about 0.003% to about 0.02% by weight thereof of 1-butyryl-1-methyl-2-(5-nitrofurfurylidene)hydrazine and poultry feedstuff.

8. A composition having anticoccidial properties upon administration to poultry, comprising the combination of from about 0.003% to about 0.02% by weight thereof of 5-nitro-2-furfurylidene hydrazine and poultry feedstuff.

9. In the practice of poultry management, the method of combatting coccidiosis which comprises administering to poultry a feedstuff having combined therewith from about 0.003% to about 0.02% by weight thereof of a chemical compound represented by the following formula:

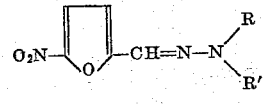

in which

R represents a member of the group consisting of hydrogen and lower alkyl, and

R′ represents a member of the group consisting of hydrogen, lower alkyl and alkanoyl.

10. In the practice of poultry management, the method of combatting coccidiosis which comprises administering to poultry a feedstuff having combined therewith from about 0.0075% to about 0.011% by weight thereof of a chemical compound represented by the following formula:
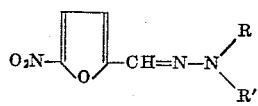
in which
R represents a member of the group consisting of hydrogen and lower alkyl, and
R' represents a member of the group consisting of hydrogen, lower alkyl and alkanoyl.
References Cited in the file of this patent
UNITED STATES PATENTS
| | | |
|---|---|---|
| 2,319,481 | Stillman | May 18, 1943 |
| 2,416,233 | Stillman | Feb. 18, 1947 |
| 2,628,183 | Johnson | Feb. 10, 1953 |

UNITED STATES PATENT OFFICE

CERTIFICATE OF CORRECTION

Patent No. 2,943,019 June 28, 1960

Michael P. Natt

It is hereby certified that error appears in the printed specification of the above numbered patent requiring correction and that the said Letters Patent should read as corrected below.

Column 4, line 16, strike out "and".

Signed and sealed this 20th day of December 1960.

(SEAL)
Attest:

KARL H. AXLINE
Attesting Officer

ROBERT C. WATSON
Commissioner of Patents